June 6, 1939.  M. L. STRAWN  2,160,920
CONTROL FOR MACHINE TOOLS
Filed July 3, 1936  2 Sheets-Sheet 1
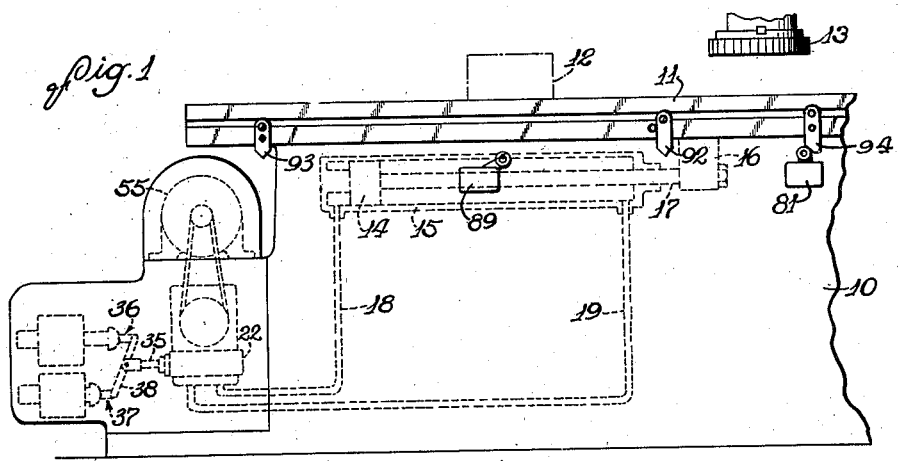
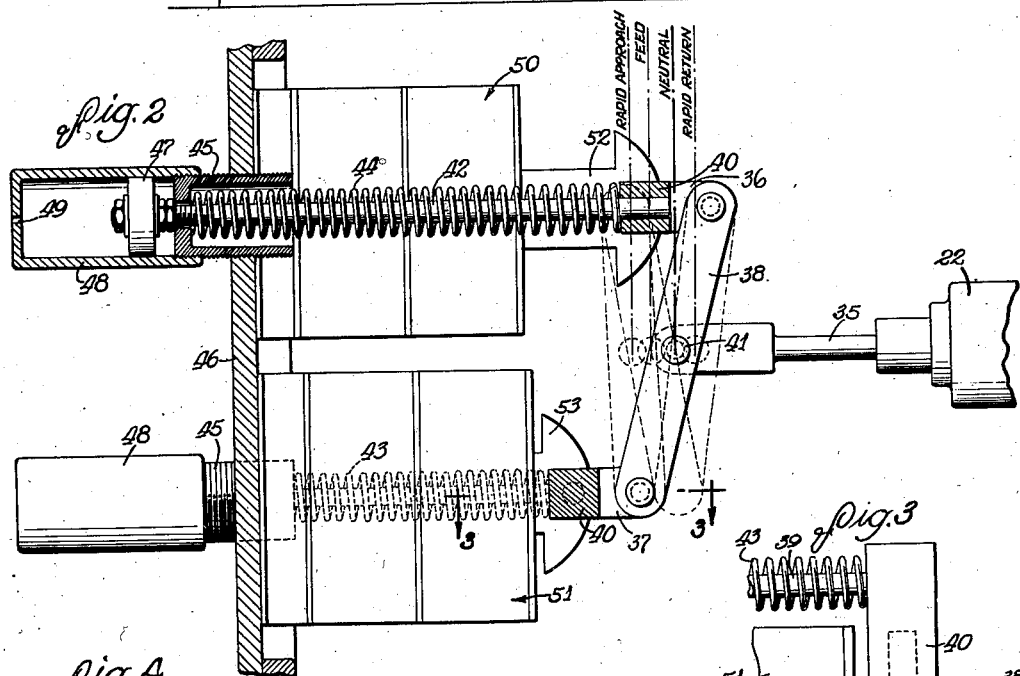
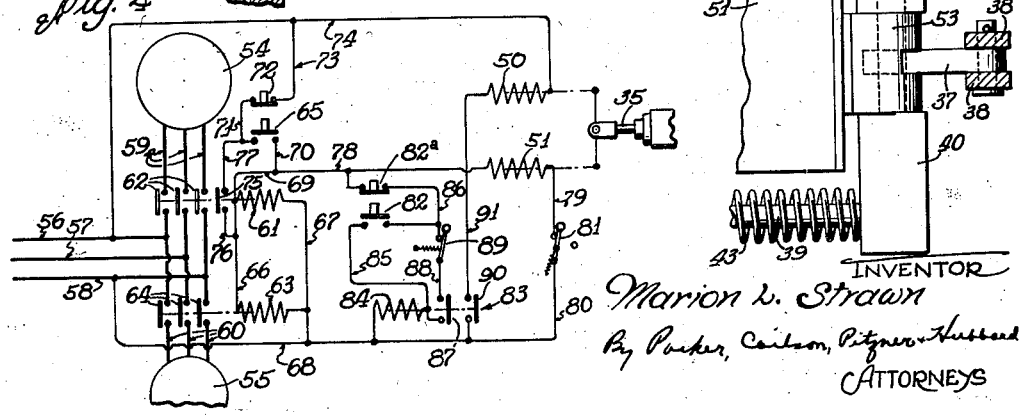
INVENTOR
Marion L. Strawn
By Parker, Carlson, Pitzner & Hubbard
ATTORNEYS June 6, 1939.  M. L. STRAWN  2,160,920
CONTROL FOR MACHINE TOOLS
Filed July 3, 1936   2 Sheets-Sheet 2
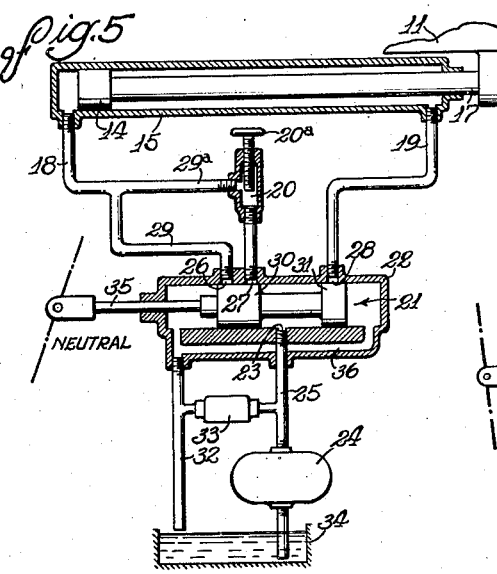
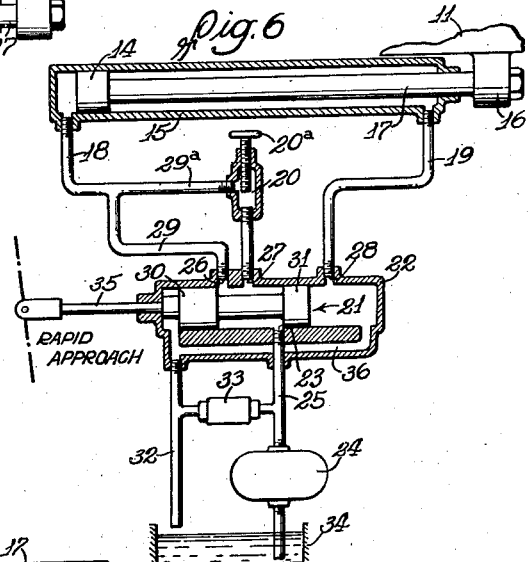
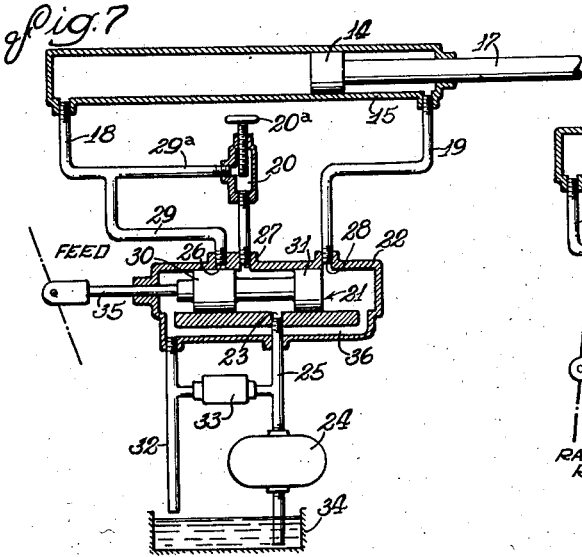
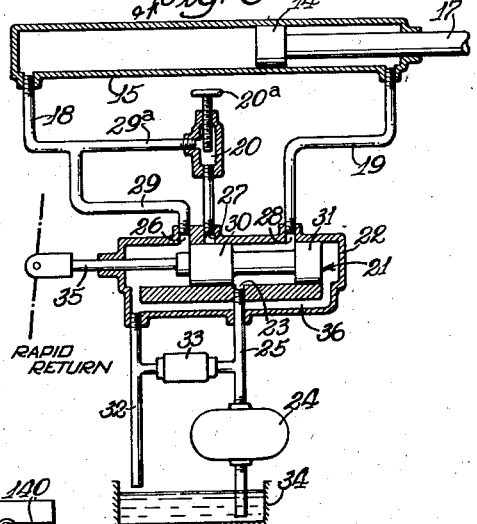
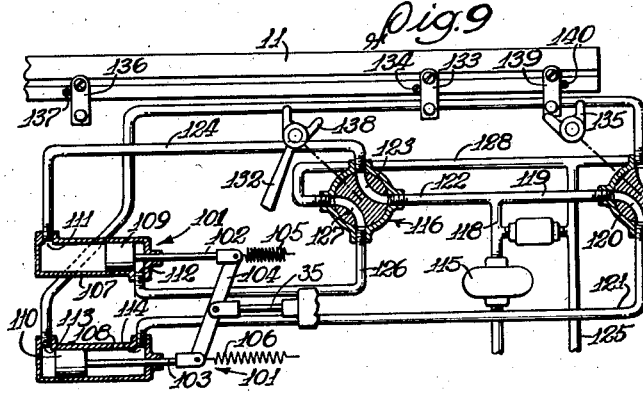
INVENTOR
Marion L. Strawn
By Parker, Carlson, Pitzner & Hubbard
ATTORNEYS Patented June 6, 1939

2,160,920

UNITED STATES PATENT OFFICE 2,160,920

CONTROL FOR MACHINE TOOLS

Marion L. Strawn, Rockford, Ill., assignor to The Ingersoll Milling Machine Company, Rockford, Ill., a corporation of Illinois Application July 3, 1936, Serial No. 88,726

10 Claims. (Cl. 90—21.5)

This invention relates generally to automatic machine tools and more particularly to a mechanism for controlling the power operator for a machine tool element to cause movement of the element in automatic cycles of feed and rapid traverse motions.

The primary object of the present invention is to provide a mechanism for effecting cyclic movements of a machine tool element including a novel arrangement for preventing injury to the machine, the operator, or the work in case any parts of the control mechanism fail to function properly.

A more detailed object is to provide a novel mechanism for controlling the cyclic movements of a machine tool element having two power driven devices and means for combining the motions thereof to produce rapid approach movement of the element when both of said devices are energized, to produce rapid return motion when both of said devices are deenergized, and to effect other control of the machine tool element when one or the other of said devices is energized.

The invention also resides in the novel character of the mechanism for combining the motions of the power actuated device and applying the same to the member by which the cyclic movements of the machine tool element are controlled.

Further objects and advantages of the invention will become apparent as the following description proceeds and the features of novelty which characterize the invention are pointed out with particularity in the claims annexed to and forming a part of this specification.

For a better understanding of the invention reference may be had to the accompanying drawings, in which Figure 1 is a side elevation of a portion of a machine tool embodying the invention.

Fig. 2 is an enlarged detail view partly in section of a portion of the control mechanism for the machine tool shown in Fig. 1.

Fig. 3 is a fragmentary plan view of a portion of the control mechanism shown in Fig. 2 being partly in section along the line 3—3.

Fig. 4 is a wiring diagram of the electric control mechanism of the machine tool shown in Fig. 1.

Fig. 5 is a detail view partly in section of the fluid actuating mechanism for the machine tool shown in Fig. 1 and its associated fluid control mechanism, the latter being shown in its neutral position.

Figs. 6, 7 and 8 are similar to Fig. 5 but illustrate the fluid control mechanism in its rapid approach, feed and rapid return positions, respectively.

Fig. 9 illustrates a modified form of control arrangement embodying the invention, this modified control arrangement being of the fluid operated type as contrasted with the electrical control shown in Figs. 1 to 4 inclusive.

Referring more particularly to the drawings, the invention has been shown for purposes of illustration as applied to a milling machine. Thus, as illustrated in Fig. 1, this machine includes a bed or base 10 having a table 11 slidably mounted thereon for endwise or translatory movement. A work piece 12 is mounted on the table 11 and is moved by the latter into engagement with the usual motor driven cutter 13.

Translatory movement of the table 11 is effected by a power actuating means, which is illustrated in the drawings in the form of a hydraulic mechanism including a piston 14 slidably mounted in a cylinder 15 and rigidly connected to a bracket 16 on the lower side of the table 11 by a piston rod 17. In general, pressure fluid is applied to selected portions of the mechanism and at a predetermined pressure to move the table 11 in a selected direction and at a predetermined speed. Thus, in the construction shown, pressure fluid is supplied through a conduit 18 to the left face of the piston 14 as viewed in Fig. 1 to move the table 11 to the right, or pressure fluid may be supplied through a conduit 19 to the right face of the piston 14 to move the table 11 to the left. Also, as shown in Fig. 5, for example, the pressure of the fluid passing through the conduit 18 may be reduced by a throttle valve 20 so as to decrease the volume supplied to the cylinder 15 and thereby establish a selected feed rate.

Referring particularly to Figs. 5 to 8 inclusive, a multiple position valve is provided for controlling the flow of pressure fluid to the cylinder 15 and comprises a member 21 slidably mounted in a casing 22. Fluid under pressure is supplied to an inlet port 23 of the casing 22 from a motor operated pump 24 through a conduit 21. The casing 22 is provided with three outlet ports 26, 27 and 28. The ports 26 and 27 communicate with the conduit 18 through branch conduits 29 and 29ª respectively, the pressure reducing valve 20 being interposed in the latter. The port 28 communicates with the conduit 19.

When the valve member 21 is in its neutral position shown in Fig. 5, collars 30 and 31 thereon close the outlet ports 26, 27 and 28 so that no pressure fluid is supplied to either end of the piston 14. The conduit 25 from the pump 24 communicates with a return conduit 32 through a pressure operated relief valve 33 so that the fluid pumped thereby will be returned to a reservoir 34 through the valve 33 and conduit 32 when the pressure in the conduit 25 reaches a predetermined maximum value.

The valve member 21 is provided with an operating stem 35 by means of which it may be shifted to a plurality of selected positions to cause feed and rapid traverse motions of the machine tool element. When the valve member 21 is moved axially to the position shown in Fig. 6, the collar 30 thereon is moved out of registry with the ports 26 and 27 so that fluid under pressure flows from the conduit 25 through the valve casing 21, ports 26 and 27, conduits 29 and 29ᵃ to the main conduit 18, and then to the interior of the cylinder 15 on the right hand side of the piston 14. At the same time, however, the collar 31 prevents pressure fluid from passing from the conduit 25 to the conduit 19. The high pressure fluid thus applied to the left face of the piston 14 causes the same to be moved through the cylinder 15 and results in a rapid approach movement of the table 11. Any fluid contained in the right hand portion of the cylinder 15 is discharged from the conduit 19 into the valve casing 21 and then through a passage 36 formed therein to the return conduit 32.

Movement of the valve member 21 to the position shown in Fig. 7 causes the collar 30 thereon to close the port 26 while leaving the port 27 open. Pressure fluid is thus supplied from the pump 24 through the conduit 25, valve casing 22, port 27, reducing valve 20, conduits 29ᵃ and 18 to the left hand portion of the cylinder 15. The valve 20 reduces the volume of the fluid applied to the left hand face of the piston 14 so that a slower feed movement of the table 11 is had. It will be noted that the pressure reducing or throttle valve 20 is provided with an adjustable member 20ᵃ by means of which the reduction in volume of the fluid passing therethrough may be selectively varied.

Rapid return movement of the table 11 is effected by moving the valve member 21 to the position shown in Fig. 8. When in this position the collar 30 thereon effectively prevents communication between the fluid supply conduit 25 and the ports 26 and 27. The collar 31 uncovers the port 28, however, so that fluid under pressure is supplied therethrough to the conduit 19 and thence to the right hand face of the piston 14. The application of pressure fluid to the right hand face of the piston 14 thus causes the table 11 to be moved to the left as viewed in Fig. 1 with a rapid return movement.

The invention contemplates actuation of the valve control member by a plurality of devices normally biased into one position and adapted to be moved in second positions by individual power actuators arranged to be energized in different combinations in a manner such as to provide for absolute safety in the operation of the machine tool. To this end, provision is made for movement of the valve member into rapid approach position by energization of both of said actuators and preferably for movement to rapid return position as a result of deenergization of both actuators, neutral and feed positions being obtained when one or the other of the actuators is energized. With this arrangement, the possibility of rapid approaching movement of the machine tool element occurring as a result of power or other failure is effectually avoided and the actuating mechanism is conditioned for rapid return movement in the event of complete failure of the actuators to operate.

In the form shown in Figs. 1 to 4, the valve control mechanism is electrically actuated, the actuators above referred to taking the form of solenoids 50 and 51 having armatures 52 and 53 which constitute the movable devices and are connected through a differential mechanism to the valve stem 35. Herein, the differential mechanism comprises an equalizing bar 38 pivotally joined at its center 41 to the stem 35 and connected at opposite ends to links 36 and 37 which in turn are joined to the respective armatures 52 and 53. Each solenoid plunger is normally biased to a predetermined position by a pair of helical compression springs 43 and 44 which surround rods 39 and 42 and bear at one of their ends against lateral projections 40 on the armatures. At the other ends, the springs are seated in cup-shaped retainers 45 threaded into a supporting wall 46.

The rods 39 and 42 carry pistons 47 which are slidably mounted in cylinders 48 threaded on the outer ends of the cup-shaped retainers 45. Small apertures 49 are formed in the outer ends of the cylinders 48 so that the latter form dashpots for limiting the speed of actuation of the armatures 52 and 53 under the action of the solenoids.

It will be seen that when either of the solenoids 50 or 51 is energized, its corresponding armature 52 or 53 will be attracted, thus moving the attached end of the equalizing lever 38 outwardly and compressing the biasing spring of the attached operating member. At the same time, the dashpots formed by the cooperating cylinders 48 and pistons 47 limit the speed of movement of the armatures 52 and 53 to a safe value.

A suitable energizing circuit, best shown in Fig. 4, has been provided for the solenoids 50 and 51 in order to cause movement of the machine tool element in the desired automatic cycle. This control circuit is preferably interconnected with the supply circuits of the cutting tool and pump driving motors in order that they may be electrically interlocked. Upon reference to Fig. 4, it will be seen that current is supplied to a cutting tool drive motor 54 and to a pump drive motor 55 from main supply lines 56, 57 and 58 through branch conductors 59 and 60 respectively. The connection of the branch conductors 59 to the main supply lines is controlled by a contactor biased to its open position and having an actuating winding 61 as well as main contact members 62. Similarly, the connection of the branch conductors 60 to the main supply lines is controlled by a contactor biased to its open position and having an energizing winding 63 as well as main contacts 64.

Upon closure of a starting switch or push button 65, the energizing circuits of the contactor actuating windings 61 and 63 are completed. It will be noted that the windings 61 and 63 are connected in parallel by conductors 66 and 67. The conductor 67 is permanently connected to the supply line 58 by a conductor 68. The conductor 66 is connected with the supply line 56 upon closure of the starting switch 65 through conductors 69 and 70, switch 65, conductor 71, normally closed stop push button 72 and conductors 73 and 74. Upon such energization of the contactor windings 61 and 63, the contactors are closed and the driving motors 54 and 55 energized. The winding 61 also closes a sealing contact 75 therefor which shunts the starting push button 65 through conductors 76 and 77 so that the windings 61 and 63 will remain energized upon release of the normally open starting push button 65.

Closure of the starting push button 65 as described above also serves to energize the solenoid 51 so that the control mechanism is moved to its neutral position. Thus, upon reference to Fig. 4, it will be seen that closure of the push button 65 completes a circuit from supply line 56 through conductors 74, 73, normally closed stop push button 72, conductor 71, switch 65, conductors 70 and 78, while the other terminal of the solenoid 51 is connected to the supply line 58 through conductors 79 and 80 and a limit switch 81. The sealing circuit formed by the conductors 76 and 77 and contact 75 also serves to maintain the solenoid 51 energized upon release of the starting button 65.

When the solenoid 51 is thus energized, its armature 53 is attracted so that the springs 43 are compressed and the operating member 37 moved to the left into the position shown in Fig. 2. As a result, the pivotal connection 41 between the floating lever 38 and valve operating rod 35 is moved to the neutral position indicated in Figs. 2 and 5. It is particularly advantageous to have the control mechanism arranged in such a manner that the neutral position requires the energization of only one of the actuating members. Otherwise, if it were necessary to actuate both of the actuating members of the control mechanism to move the valve member into its neutral position, one of the actuating members might fail to move due to the breakage of a part or sticking of one of the members. In such case, the valve would be moved to a position to initiate unintended movement of the machine tool element.

After the driving motors 54 and 55 have been started as described above, the cycle of operation of the machine tool is initiated by closing a normally open push button 82. This completes the energizing circuit for a normally open contactor 83 which in turn controls the energization of the solenoid 50. Thus, one terminal of an actuating winding 84 of the contactor 83 is connected to the conductor 78 through a conductor 85, push button 82, conductor 86 and normally closed stop push button 82ª. As was pointed out above, the conductor 78 is connected to the supply line 56 at all times after the starting push button 65 is closed until the machine is stopped. The other terminal of the contactor actuating winding 84 is connected to the supply line 58 through the conductor 68. The contactor 83 is provided with an auxiliary contact 87 which serves to complete a sealing circuit for the contactor so that it will remain closed after the release of the momentarily actuated push button 82. Thus, the contact 87 completes a shunt circuit about the push button 82 through a conductor 88 and limit switch 89. The closure of the contactor 83 also closes its main contacts 90 completing an energizing circuit for the solenoid 50. One terminal of the solenoid 50 is permanently connected to the conductor 74 which is in turn connected to the supply line 56 while the other terminal of the solenoid 50 is connected to conductor 68 through a conductor 91 and contacts 90.

Energization of the solenoid 50 results in attraction of armature 52 and movement of the same to the left as viewed in Fig. 2. Since the solenoid 51 is already energized at this point in the cycle, the pivot point 41 on the floating lever 38 is moved to the rapid approach position indicated in Figs. 2 and 6. In such position, the valve stem 35 is moved to the left extremity of its path of movement illustrated in Fig. 6 and as a result, pressure fluid is supplied to the actuating mechanism cylinder 15 in such a manner as to move the table 11 forwardly with a rapid traverse movement. The work piece 12 on the table 11 is consequently moved toward the milling cutter 13 at a rapid rate.

The change from rapid approach to feed rate is effected by deenergization of the solenoid 51 while the solenoid 50 remains energized. This may be accomplished by a dog 92 which is detachably secured to the side of the table 11 and is adapted to actuate the limit switch 81 when it comes in contact therewith. The dog 92 is pivotally mounted and may be positioned at any selected point along the side of the table 11. A stop pin 92ª prevents clockwise movement of the dog 92 past the position shown but permits a free counter-clockwise movement thereof. The limit switch 81 is preferably of a snap acting type and includes an over-center spring arrangement adapted to hold the same in either of the two positions to which it may be moved. Thus, when the dog 92 engages the limit switch 81 during the rapid approach movement of the table 11, the switch 81 is snapped to its open position and remains in such open position until it is again actuated in the opposite direction.

Opening of the limit switch 81 disconnects the solenoid 51 from the supply line 58 releasing the armature 53 for outward movement by the compression springs 43. When the solenoid 51 is deenergized while the solenoid 50 remains energized, the floating lever 38 is moved so that the pivot point 41 with the valve stem 35 assumes the feed position indicated by the dot-dash line in Figs. 2 and 7. As a consequence, the volume of fluid supplied to the machine tool actuating mechanism is reduced as described above so that the translatory motion of the table 11 is continued at a relatively slower feed rate.

A further arrangement is provided for automatically reversing the direction of movement of the table 11 upon the completion of the desired cutting operation and in addition, the table is moved in the reverse direction at a rapid return rate. The control mechanism is so arranged that all of its parts will be in their normal or deenergized positions when this rapid return movement takes place. This is an advantageous safety precaution as will be apparent from a brief analysis of the operation of the machine. Thus, if the electrical energy or other power supplied to the machine fails for any reason, the machine will "fail safe". That is to say, in the present instance, if the power supply on the supply lines 56, 57 and 58 is interrupted, both the solenoids 50 and 51 will be deenergized, and the control mechanism will be shifted to its rapid return position. In this way, the momentum of the pump driving motor 55, coasting to a stop, is utilized to supply fluid under pressure for moving the work piece 12 away from the cutting tool 13 so that it is safely disengaged therefrom.

In the construction illustrated, the rapid return movement of the table is initiated by a dog 93 detachably secured to the side of the table 11 at any desired point. At the completion of the selected feed motion of the table 11, the dog 93 engages the limit switch 89 and moves the same momentarily to its open position. The limit switch 89 is normally biased to its closed position so that it will again close as soon as it is released by the dog 93. The opening of the limit switch 89 also opens the sealing circuit for the actuating winding 84 of contact 83, however, thus permitting the contactor to move to its open position. Upon such opening of the contacts 90 of contactor 83, the solenoid 50 is deenergized and remains in such condition until the contactor 83 is again closed.

From the foregoing, it will be seen that at this point in the cycle of operation both of the solenoids 50 and 51 are deenergized so that both armatures move outwardly thereby moving the pivotal connection 41 to the rapid return position shown in dot-dash line in Figs. 2 and 8. This movement of the valve stem 35 actuates the valve member 21 to the position shown in Fig. 8 so that pressure fluid is supplied to the machine tool actuating mechanism in such a manner as to effect a rapid return movement of the work table 11 as was described above.

As soon as the table 11 begins its rapid return movement, the dog 93 moves out of engagement with the normally closed limit switch 89 thus permitting the latter to close again. Such closure of the limit switch 89 does not, however, result in a re-closure of contactor 83 and reenergization of solenoid 50 since the limit switch 89 is located in the sealing circuit for the contactor rather than in the main energizing circuit. Upon continued rapid return movement of the table 11, the dog 92 rides freely over the limit switch 81 so that it does not actuate the same. When the table 11 finally reaches its initial or starting position, however, a dog 94 engages the limit switch 81 and moves the same to its closed position. This again completes the energizing circuit for solenoid 51 so that the valve member 21 is moved to its neutral position shown in Fig. 5 as described above. As a result, the flow of pressure fluid to the machine element actuating mechanism is cut off and the movement of the table arrested.

The cycle of operation for the machine may again be initiated at will by closure of the starting push button 82. In the event of an emergency or for any other reason, the operation of the machine may be stopped at will by opening the stop push button 72. Such opening of this push button deenergizes the contactor windings 63 and 68 thus disconnecting the entire apparatus from the supply lines 56, 57 and 58.

In addition, the control mechanism may be moved to its neutral position at will at any time during the operation of the machine without stopping the main drive motors 54 and 55. This is effected simply by the opening of stop push button 82ᵃ which opens the switch 83 thus deenergizing the solenoid 50. When the solenoid 50 is deenergized and the solenoid 51 left energized as is the case upon the opening of push button 82ᵃ, the control mechanism is moved to its neutral position thus stopping the movement of the table 11.

With the parts arranged for operation in the manner above described, it will be observed that there is no possibility of the valve mechanism becoming set for rapid approach motion on account of failure of power or for any other cause. Also, failure of any one of the individual power actuated devices will ordinarily result in conditioning of the control mechanism for rapid return. Provision is therefore made for operation of the machine tool with optimum safety. Moreover, with the particular differential mechanism employed, it is unnecessary to move the controlling valve member from neutral to rapid approach position or from rapid approach to feed position without going through rapid return position and to move the member from feed to rapid return position without going through the rapid approach position.

Fig. 9 illustrates a modified form of control mechanism in which the valve shifting devices are energized by pressure fluid. In this embodiment, the flow of pressure fluid to the table actuating mechanism is governed by a valve which is identical with that shown in Figs. 5 to 8 and described above.

In general, the control mechanism in Fig. 9 includes two pressure fluid motors 100 and 101 comprising cylinders 107 and 108 with pistons 109 and 110 therein having their rods 102 and 103 pivotally connected to the outer ends of a floating lever or equalizing link 104, which is in turn pivotally connected intermediate its ends to the valve operating stem 35. Tension springs 105 and 106 serve to normally bias the rods 102 and 103 respectively to their extremity of movement in a right-hand direction as viewed in Fig. 9.

The cylinders 107 and 108 are provided with ports 111—112 and 113—114, respectively, at their opposite ends. When pressure fluid is supplied to the cylinders 107 and 108 through ports 112 and 114, respectively, the pistons 109 and 110 will be moved to the left against the bias of the springs 105 and 106, respectively. The flow of pressure fluid from a pump 115 to the cylinders 107 and 108 is governed by a pair of distribution valves 116 and 117.

When the distributing valves 116 and 117 are in the position shown in Fig. 9, the cylinder 108 is energized or supplied with pressure fluid while the piston 109 is biased to the position illustrated by tension spring 105. Consequently, the valve operating stem 35 is maintained in the neutral position shown in Figs. 9 and 5 so that the supply of pressure fluid to the main machine tool actuating mechanism is cut off as has been previously described and the table 11 remains stationary.

Pressure fluid is supplied from the pump 115 to the cylinder 108 to maintain the control mechanism in its neutral position through conduits 118 and 119, passage 120 in valve 117 and conduit 121. On the other hand, pressure fluid is supplied from the pump 115 through conduits 118 and 122, passage 123 in valve 116 and conduit 124 to port 111 in the cylinder 107 so that the resulting movement of the piston 109 aids the tension spring 105 in moving the rods 102 to the right as viewed in Fig. 9. At the same time, the ports 112 and 113 of cylinders 107 and 108 are connected to an outlet conduit 125. Thus, upon reference to Fig. 9, it will be seen that the port 112 is connected to the conduit 125 through a conduit 126, passage 127 in valve 116, and conduit 128. Similarly, the port 113 in the cylinder 108 is connected to the outlet conduit 125 through a conduit 129, passage 130 in valve 117, and conduit 131.

In order to initiate the cycle of operation of the machine tool, the valve 116 is rotated 90 degrees in a counter-clockwise direction as viewed in Fig. 9 by a manual operating handle 132. This connects conduits 124 and 128 while passage 127 connects conduits 122 and 126. Thus, pressure fluid is supplied not only to the cylinder 108 of control member 101 to energize the same but also to cylinder 107. The fluid flows from the pump 115 through conduits 122, valve passage 127 and conduit 126 to port 112 of cylinder 107. As a result, both of the pistons 109 and 110 are moved to the left as viewed in Fig. 9, and the valve operating stem 35 is moved to the position shown in Fig. 6 so that a rapid approach movement of the table 11 is had.

An arrangement is provided for automatically causing the control mechanism to move the valve stem 35 to its "feed" position shown in Fig. 7 at a desired point in the traversing movement of the table 11 so that the speed of the table will be reduced while the work piece and cutting tool are in operative engagement. This arrangement includes a pivotally mounted dog 133 which is detachably secured to the side of the table 11 at any desired point. A stop pin 134 prevents movement of the dog 133 in a clockwise direction beyond the vertical position illustrated so that when the dog contacts a pivotally mounted operating fork 135 of the valve 117, it rotates the same approximately 90 degrees in a clockwise direction. Such rotation of the valve 117 serves to cut off the flow of pressure fluid to the cylinder 108 without cutting off the flow of pressure fluid to the control member 100. Thus, the port 114 of cylinder 108 is connected to the outlet conduit 125 through conduit 121, valve passage 130 and conduit 131 so that the pressure on the right hand face of the piston 110 is released. Also, pressure fluid is supplied to the port 113 of cylinder 108 to aid in the retractive movement of the rod 103 through conduits 129, valve passage 120, and conduits 119 and 118. At the same time, pressure fluid is supplied from the pump 115 to the port 112 of cylinder 107 through conduits 118 and 122, valve passage 123 and conduit 126. As a result, the valve operating stem 35 is moved to the position shown in Fig. 7 so that the fluid is supplied in reduced volume to the machine tool actuating mechanism and the movement of the table 11 continues at a relatively slower feed rate.

An arrangement has been provided which is responsive to the movement of the table 11 to a position in which the metal removing operation is completed for reversing the direction of movement of the table and causing it to be retracted at a rapid return rate. This movement is initiated by a pivotally mounted dog 136 which is detachably secured to the side of the table 11. Clockwise movement of the dog 136 is limited by a stop pin 137 so that when the dog 136 engages a forked operating member 138 on the valve 116, the valve is rotated substantially 90 degrees in a clockwise direction to the position shown in Fig. 9. In such case, the flow of pressure fluid is cut off to not only the port 112 of cylinder 107 but also the port 114 of cylinder 108. Thus, the port 112 is connected to the outlet conduit 125 through conduit 126, valve passage 127, and conduit 128, while port 114 is connected to the outlet conduit 125 through conduit 121, valve passage 130, and conduit 131. During the return movement of the table 11, the dog 136 rides freely over the fork 138 without moving the valve 116 since no stop pin is provided on the right-hand side of the dog 136. Similarly, the dog 133 also rides freely over the fork 135 without affecting the valve 117 since there is also no stop provided on the right-hand side of this dog.

The rapid return movement of the table 11 continues until a pivotally mounted dog 139 on the side of the table 11 engages the valve operating fork 135. A stop pin 140 is provided on the right-hand side of this dog. Such engagement of the dog 139 with fork 135 rotates the valve 117 in a counter-clockwise direction for substantially 90 degrees so that it again assumes the position shown in Fig. 9. Thus, both the valves 116 and 117 are returned to their initial positions so that the control mechanism moves the valve stem 35 to its neutral position shown in Fig. 5 as described above. The same cycle of operation may then be again initiated by moving the manual operating lever 132.

Although two particular embodiments of the invention have been illustrated and described with some particularity for purposes of illustration, it should be understood that no intention is to be inferred from this that the invention is to be limited to the particular constructions shown and described, but on the other hand, the appended claims are intended to cover all modifications within the spirit and scope of the invention.

I claim as my invention:

1. In a machine tool having a movable element, the combination of a single control member movable between two terminal positions through two intermediate positions, mechanism controlled by said member for causing rapid approach and rapid return motions of a machine tool element when said member is disposed in the respective terminal positions, for causing movement of said element at a feed rate when the member is in one of said intermediate positions, and for holding said element against movement when said member is in the other of said intermediate positions, two independently movable devices, means individually biasing said devices in one direction, individual power actuators each adapted when energized to move one of said devices against the action of its biasing means, and an equalizing bar connected at spaced points to the respective devices and intermediate said points to said member for moving said member to said rapid approach position when both of said actuators are energized, to rapid return position when neither of said actuators is energized, and in said intermediate positions respectively when said actuators are individually energized.

2. In a machine tool having a movable element, the combination of a control member movable between two terminal positions through two intermediate positions, mechanisms controlled by said member for causing rapid approach and rapid return motions of said element when said member is disposed in the respective terminal positions, for causing movement of said element at a feed rate when the member is in one of said intermediate positions, and for holding said element against movement when said member is in the other of said intermediate positions, two independently movable devices each biased for movement into one position, individual power actuators each adapted when energized to move one of said devices into a second position against the action of its biasing means, and differentially acting means for combining the motions of said devices and moving said member to position the same in said rapid approach position when both of said actuators are energized, in rapid return position when neither of said actuators is energized, and in said intermediate positions respectively when said actuators are individually energized.

3. In a machine tool having a movable element, the combination of a single control member movable between two terminal positions through an intermediate position, mechanism controlled by said member for causing rapid approach and rapid return motions of said element when said member is disposed in the respective terminal positions and for causing movement of said element at a feed rate when the member is in said intermediate position, two independently movable devices each biased for movement into one position, two solenoids each adapted when energized to move one of said devices into a second position against the action of its biasing means, and differentially acting means for combining the motions of said devices and moving said member to position the same in said rapid approach position when both of said solenoids are energized, in rapid return position when neither of the solenoids is energized, and in said intermediate position when only one of the solenoids is energized.

4. In a machine tool having a movable element, the combination of a control member movable into at least three different positions, mechanism controlled by said member for causing movement of said element at rapid approach, rapid return and feed rates when said member is disposed in the respective positions, two independently movable devices each biased for movement in one direction, individual power actuators each adapted when energized to move one of said devices against the action of its biasing means, and means connecting said devices and said member and differentially combining the motions of said devices and moving said member to position the same in said rapid approach position when both of said actuators are energized, in rapid return position when neither of said actuators is energized, and in feed position when only one of said actuators is energized.

5. In a machine tool having a movable element, the combination of a control member movable into at least three different positions, mechanism controlled by said member for causing movement of said element at rapid approach, rapid return and feed rates when said member is disposed in the respective positions, two independently movable devices each biased for movement in one direction, individual power actuators each adapted when energized to move one of said devices against the action of its biasing means, and an equalizing lever connected at opposite ends to the respective devices and intermediate its ends to said member and arranged to move the member to said rapid approach position when both actuators are energized, to rapid return position when both actuators are deenergized, and to said feed position when a certain one of the actuators is energized.

6. In a machine tool having a movable element, the combination of a single control member movable into three different positions, mechanism controlled by said member for causing movement of said element at rapid approach, rapid return and feed rates when said member is disposed in the respective positions, two independently movable devices each biased for movement in one direction, individual power actuators each adapted when energized to move one of said devices against the action of its biasing means, and means connecting said devices and acting differentially to combine the motions of said devices and moving said member to the respective positions according to whether one, both or neither of said actuators are energized, said member being moved to said rapid approach position when both of said actuators are energized.

7. In a machine tool having a movable element, the combination of a single control member movable into three different positions, mechanism controlled by said member for causing movement of said element at rapid approach, rapid return and feed rates when said member is disposed in the respective positions, two independently movable devices each biased for movement in one direction, individual power actuators each adapted when energized to move one of said devices against the action of its biasing means, and means connecting said devices and acting differentially to combine the motions of said devices and moving said member to the respective positions according to whether one, both or neither of said actuators are energized, said member being moved to said rapid return position when neither of said actuators is energized.

8. In a machine tool having a movable element, the combination of power driven means for actuating said element, mechanism controlling said driving means to effect movement of said element in different directions and at different rates including two independently movable devices each biased into a predetermined position and selectively operable in different combinations to cause movement of the element at rapid approach, rapid return and feed rates, and individual electromagnetic actuators each adapted when energized to move one of said devices against the action of its biasing means, said element being moved at rapid return rate when both of said devices are in their biased positions whereby to utilize the momentum of said power driving means in stopping upon failure of the power supply thereto to initiate return movement of said element.

9. In a machine tool, the combination of a work support, a metal removing tool, power actuated mechanism for effecting relative translatory movement of said work support and tool toward and away from each other, control means for said power actuated mechanism including a plurality of energizable electric solenoids, and means responsive to an interruption in the voltage applied to said solenoids for causing said control means to effect relative movement of said work support and said tool away from each other.

10. In a machine tool, the combination of a work support, a tool support carrying a metal-removing tool, power actuated mechanism operable to produce forward and rapid return movements of one of said supports, control means selectively operable to govern the operation of said mechanism to determine the direction and rate of movement of the actuated support, and electrical devices energizable selectively to actuate said control means and operable when deenergized by interruption of the supply of energy to said control means to actuate the control means and cause movement of the actuated support in a direction to effect relative retraction between the tool and work supports whereby to utilize the momentum of the actuated support and said mechanism in coasting to a stop to carry said tool and the work piece on said work support out of engagement with each other.

MARION L. STRAWN.